(12) United States Patent
Masatsugu et al.

(10) Patent No.: US 12,304,312 B2
(45) Date of Patent: May 20, 2025

(54) LIGHTING DEVICE AND DISPLAY PANEL

(71) Applicant: TOYODA GOSEI CO., LTD., Kiyosu (JP)

(72) Inventors: Yoshinori Masatsugu, Kiyosu (JP); Yusuke Ueshima, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 103 days.

(21) Appl. No.: 18/145,074

(22) Filed: Dec. 22, 2022

(65) Prior Publication Data
US 2023/0271502 A1    Aug. 31, 2023

(30) Foreign Application Priority Data

Feb. 28, 2022  (JP) .................................. 2022-030472

(51) Int. Cl.
    *B60K 35/60*     (2024.01)
    *B60K 35/28*     (2024.01)
    *B60Q 3/10*      (2017.01)
(52) U.S. Cl.
    CPC ................ *B60K 35/60* (2024.01); *B60Q 3/10* (2017.02); *B60K 35/28* (2024.01); *B60K 2360/162* (2024.01); *B60K 2360/175* (2024.01); *B60K 2360/60* (2024.01); *B60Q 2500/20* (2013.01)
(58) Field of Classification Search
    None
    See application file for complete search history.

(56) References Cited

U.S. PATENT DOCUMENTS

| | | | |
|---|---|---|---|
| 10,618,408 B2 | 4/2020 | Kawashima et al. | |
| 10,696,218 B1 | 6/2020 | Kontani | |
| 2018/0201133 A1* | 7/2018 | Sumiya | G01D 11/28 |
| 2019/0381884 A1 | 12/2019 | Kawashima et al. | |
| 2020/0198535 A1 | 6/2020 | Kontani | |
| 2021/0107400 A1* | 4/2021 | Erler | B60R 13/02 |

FOREIGN PATENT DOCUMENTS

| | | |
|---|---|---|
| JP | H11-015414 A | 1/1999 |
| JP | 2008-117681 A | 5/2008 |
| JP | 2010-208543 A | 9/2010 |
| JP | 6370426 B1 | 8/2018 |
| JP | 2020-101781 A | 7/2020 |

OTHER PUBLICATIONS

Office Action dated dated Aug. 27, 2024 issued in corresponding Japanese Application No. 2022-030472 (and English translation).
Office Action dated Nov. 26, 2024 issued for the corresponding Japanese Patent Application No. 2022-030472 (and English translation).

* cited by examiner

*Primary Examiner* — Rebecca A Volentine
(74) *Attorney, Agent, or Firm* — Posz Law Group, PLC (57) ABSTRACT

Provided is technology that enables a lighting device to luminously display a clear sign. A display panel 3 of a lighting device 1 has a layered structure including a transparent base layer 30, a decorative layer 33 having a general decorative portion 33g and a display decorative portion 33d, and a blocking layer 35 having a general blocking portion 35g and a display blocking portion 35d. A blocking outer-edge portion 35e which is at least a part of an outer edge of the display blocking portion 35d is located on a radially outer side relative to a paired decorative outer-edge portion 33e.

6 Claims, 5 Drawing Sheets

LIGHTING DEVICE AND DISPLAY PANEL

TECHNICAL FIELD

The present invention relates to a display panel for luminously displaying a sign, and a lighting device including the display panel.

BACKGROUND ART

In recent years, lighting devices that luminously display various signs about the operation state of an electric apparatus and the like have been proposed. In this type of lighting device, a display panel located on the front side of a light source has a display area through which light emitted by the light source is transmitted to display a sign on the front side of the light source (see, for example, Japanese Laid-Open Patent Publication No. 2008-117681).

SUMMARY OF INVENTION

Technical Problem

Japanese Laid-Open Patent Publication No. 2008-117681 discloses a lighting device in which the above-described display area is provided at an end-wall part of a knob portion (so-called button) of a press switch, to light up around the knob portion.

In a case where a lighting device luminously displays a plurality of different signs, the lighting device is provided with a plurality of light sources and a display panel located on the front side of the light sources has a plurality of display areas corresponding to the respective light sources.

That is, in this type of lighting device, light emitted by each light source is transmitted through each different display area, thus displaying a plurality of different signs.

This type of lighting device is considered to have a plurality of light emission portions each having a combination of one light source and one display area corresponding to the light source.

In the lighting device having the plurality of light emission portions as described above, if the distance between the adjacent light emission portions is short, leakage of light may occur between the adjacent light emission portions.

That is, in the lighting device having the plurality of light emission portions, light emitted by the light source of one light emission portion may enter a light path of the light emission portion adjacent thereto (in other words, another light emission portion), so as to be emitted to outside through the display area of the adjacent light emission portion.

In this case, the boundary between the adjacent light emission portions appears vague, so that there may be difficulty in luminously displaying a clear sign by each light emission portion.

Further, in this case, design performance and functionality of the lighting device may be reduced.

The present invention has been made in view of the above circumstances, and an object of the present invention is to provide technology that enables a lighting device to luminously display a clear sign.

Solution to Problem

In order to achieve the above object, a lighting device of the present invention includes: a plurality of light sources; a display panel located on a front side of the light sources; and a light-blocking case portion storing each light source in a state in which a light path of the light source directed toward the front side is opened. The display panel has a layered structure including a transparent base layer, a decorative layer located on the front side relative to the transparent base layer, and a blocking layer located on a back side relative to the transparent base layer. The decorative layer has a general decorative portion, and a plurality of display decorative portions each located on the front side of the corresponding light source and having a higher light transmittance than the general decorative portion. The blocking layer has a general blocking portion, and a plurality of display blocking portions each opposed to the paired display decorative portion and having a higher light transmittance than the general blocking portion. In a projection view when projected in a front-back direction, a blocking outer-edge portion which is at least a part of an outer edge of each display blocking portion is located on a radially outer side relative to a decorative outer-edge portion which is an outer edge of the paired display decorative portion.

The lighting device of the present invention enables luminous display of a clear sign. In addition, the display panel of the present invention enables the lighting device to luminously display a clear sign.

DESCRIPTION OF EMBODIMENTS

The lighting device of the present invention includes a plurality of light sources and a display panel present on the front side of the light sources. The display panel includes, in addition to a transparent base layer, a decorative layer present on the front side of the transparent base layer. The decorative layer has a display decorative portion which is a part present on the front side of each light source, and a general decorative portion which is a part other than the display decorative portion. The light transmittance of the display decorative portion is higher than the light transmittance of the general decorative portion.

Therefore, in the lighting device of the present invention, light emitted by each light source and transmitted through the transparent base layer of the display panel is transmitted through the display decorative portion of the decorative layer of the display panel, to be emitted to the front side of the display panel. Thus, on the front side of the lighting device of the present invention, a sign corresponding to the design of the display decorative portion is luminously displayed.

Further, the display panel in the lighting device of the present invention includes, in addition to the decorative layer and the transparent base layer described above, a blocking layer present on the back side of the transparent base layer. The blocking layer has a display blocking portion which is a part present on the front side of each light source, and a general blocking portion which is a part other than the display blocking portion. The light transmittance of the display blocking portion is higher than the light transmittance of the general blocking portion.

That is, in the display panel in the lighting device of the present invention, the display blocking portion and the display decorative portion paired with the display blocking portion are arranged in the thickness direction of the display panel with the transparent base layer interposed therebetween. Then, in the display panel, the display blocking portion and the display decorative portion, and the part interposed therebetween, of the transparent base layer, are considered to correspond to a display area through which light emitted by the light source is transmitted to display a sign on the front side of the light source.

In the lighting device of the present invention, light emitted by each light source and advancing toward the front side of the light source is transmitted through the display blocking portion of the blocking layer, to enter the transparent base layer, and then is emitted toward the front side of the display panel through the display decorative portion of the decorative layer. Meanwhile, light emitted by each light source and advancing in a direction other than the front-side direction of the light source is blocked by the general blocking portion of the blocking layer.

That is, the blocking layer blocks a light path directed toward a direction other than the front-side direction, among light paths of light emitted by each light source.

Thus, light emitted by each light source is unlikely to reach the adjacent display area, so that the lighting device of the present invention enables luminous display of a clear sign.

Here, a part of light emitted by the light source is blocked by the general blocking portion. However, if the amount of light blocked by the general blocking portion is excessively large, in other words, if the size of the display blocking portion is excessively small as compared with the display decorative portion, there is difficulty in causing a sufficient amount of light to reach the entire display decorative portion. In this case, for example, the display decorative portion appears partially lacking, thus leading to loss of a design displayed by the display panel.

On the other hand, in the lighting device of the present invention, a blocking outer-edge portion which is at least a part of an outer edge of the display blocking portion in the display panel is located on the radially outer side relative to a decorative outer-edge portion which is an outer edge of the paired display decorative portion.

Therefore, according to the lighting device of the present invention, a sufficient amount of light reaches the entire display decorative portion, thus preventing such a defect that the display decorative portion appears partially lacking.

Thus, the lighting device of the present invention enables luminous display of a clearer sign.

Similarly, the display panel of the present invention enables luminous display of a clearer sign by the lighting device of the present invention.

Hereinafter, the lighting device and the display panel of the present invention will be described for constituent components individually. Here, the display panel of the present invention is the display panel in the lighting device of the present invention.

Modes for carrying out the present invention will be described below. Unless otherwise specified, a numerical value range "x to y" described herein includes, in the range thereof, a lower limit x and an upper limit y. A new numerical value range may be formed by optionally combining the upper limit values and the lower limit values, and numerical values described in the embodiments. Numerical values optionally selected from any of the numerical value ranges may be used as the upper and lower limit values in a new numerical value range.

The lighting device of the present invention includes the display panel, and luminously displays various signs such as the operation state of an electric apparatus on the display panel. The lighting device of the present invention may be separate from a corresponding electric apparatus, or may be integrated with the electric apparatus.

For example, the lighting device of the present invention is embodied as a lighting device for vehicle. In this case, the lighting device of the present invention is suitable for luminously displaying signs representing the operation states of various electric apparatuses for vehicle.

More specifically, examples of the signs include ON/OFF of an air conditioner for vehicle, the set temperature of the air conditioner, the air volume of the air conditioner, ON/OFF of a seat heater, and ON/OFF of automated driving of a vehicle.

While luminously displaying a sign representing the operation state of an electric apparatus as described above, the lighting device of the present invention may be integrated with a switch for performing operation control of the electric apparatus. In this case, an occupant touches the sign to perform ON/OFF operation of the electric apparatus by the switch.

The lighting device of the present invention includes the plurality of light sources, the light-blocking case portion, and the display panel.

The types of the light sources are not limited, and general light sources such as an LED lamp and a halogen lamp may be used. Also, the number of the light sources is not particularly limited. Preferably, light emitted by the light sources is visible light having a wavelength of 360 to 830 nm.

The light-blocking case portion stores each light source described above. The lighting device of the present invention may include a plurality of light-blocking case portions individually storing a plurality of light sources, or may include one light-blocking case portion collectively storing a plurality of light sources.

In either case, the light-blocking case portion stores each light source in a state in which a light path of the light source directed toward the front side is opened. In other words, the light-blocking case portion stores each light source in a state in which light emitted by the light source is allowed to be transmitted at the front side of the light source while being blocked at the part other than the front side of the light source. Since light is blocked at the part other than the front side of the light source by the light-blocking case portion, light emitted by each light source is prevented from reaching another display area adjacent to the corresponding display area.

More specifically, the light-blocking case portion preferably has a side wall covering the light source from the radially outer side. Then, in order to reduce loss of light emitted by the light source, the inner peripheral surface of the side wall, i.e., the surface on the light source side, is more preferably a reflection surface that reflects visible light.

As described above, the display panel has a layered structure including the transparent base layer, the decorative layer, and the blocking layer, and is located on the front side of the light source.

Among these, the transparent base layer is literally transparent, and is thicker than the decorative layer and the blocking layer. The thicknesses of the decorative layer and the blocking layer are preferably not greater than 10% of the thickness of the transparent base layer, and more preferably not greater than 5% of the thickness of the transparent base layer.

As used herein, the wording "transparent" means that the transmittance for visible light is not less than 70%. The transparent base layer may or may not be colorless.

The material of the transparent base layer is not particularly limited, but as the material, a resin material such as polycarbonate or acrylic resin is preferably used.

The decorative layer is located further toward the front side relative to the transparent base layer. As described above, the decorative layer includes the display decorative portion and the general decorative portion.

The display decorative portion is a part located on the front side of each light source, of the decorative layer. The general decorative portion is apart other than the display decorative portion, of the decorative layer. The lighting device of the present invention includes the plurality of light sources, and includes the display decorative portions whose number corresponds to the number of the light sources.

The light transmittance of the display decorative portion is higher than the light transmittance of the general decorative portion. This is for luminously displaying a design corresponding to the shape of the display decorative portion on the front surface of the display panel.

Examples of combinations of a preferable range of the light transmittance of the display decorative portion and a preferable range of the light transmittance of the general decorative portion include a combination in which the light transmittance of the display decorative portion is 30% to 1% and the light transmittance of the general decorative portion is less than 1%, a combination in which the light transmittance of the display decorative portion is 25% to 2% and the light transmittance of the general decorative portion is less than 2%, and a combination in which the light transmittance of the display decorative portion is 20% to 3% and the light transmittance of the general decorative portion is less than 3%.

As used herein, the light transmittance means transmittance for the wavelength range of light emitted by the light source. For example, if the light source emits visible light, the light transmittance of each portion is a transmittance for visible light.

The display decorative portion is preferably made of a transparent material such as transparent resin, for example. The general decorative portion is preferably made of one or a plurality of kinds of materials such as a paint, a colored resin material, a molded-in-color resin material, and metal, for example. For reference, the molded-in-color resin material refers to a material in which resin itself is colored by mixing a coloring material such as a pigment into a resin material or mixing a bright material into a resin material together with a coloring material.

A method for forming the decorative layer on the front side of the transparent base layer is not particularly limited, and for example, a known method such as printing, painting, deposition, or adhesion is employed. In a case such as forming the decorative layer on the front side of the transparent base layer by adhesion, another layer such as an adhesion layer may be interposed between the transparent base layer and the decorative layer. In this case, preferably, the light transmittance of the above other layer is approximately equal to the light transmittance of the transparent base layer or the light transmittance of the display decorative portion of the decorative layer. Particularly preferably, the refractive index of the adhesion layer is approximately equal to the refractive index of the transparent base layer. As used herein, the wording "approximately equal" means being within 15% of the target value.

The shape of the display decorative portion of the decorative layer is not particularly limited, and various shapes corresponding to signs to be displayed may be employed. The light transmittance of the display decorative portion may be uniform. Alternatively, the light transmittance of the display decorative portion may be different among parts.

In a case where the light transmittance of the display decorative portion is different among parts, the light transmittance of the display decorative portion refers to the light transmittance of the highest-light-transmittance part in the display decorative portion.

Similarly, the light transmittance of the general decorative portion may be uniform or may be different among parts.

In a case where the light transmittance of the general decorative portion is different among parts, the light transmittance of the general decorative portion refers to the light transmittance of the highest-light-transmittance part in the general decorative portion.

In addition, for example, a low-light-transmittance part may be provided on the inner side of a high-light-transmittance part in the display decorative portion, so as to display a character, a symbol, or the like by the low-light-transmittance part.

Here, in a case where the light transmittance of the above inner-side part is not greater than a value approximately equal to the light transmittance of the highest-light-transmittance part in the general decorative portion, the inner-side part may be regarded as the general decorative portion.

Even in a case where the light transmittance of the above inner-side part is greater than the light transmittance of the highest-light-transmittance part in the general decorative portion, i.e., the light transmittance of the above inner-side part is higher than the light transmittance of the highest-light-transmittance part in the general decorative portion by 5% or more, if the light transmittance of the inner-side part is less than a value approximately equal to the light transmittance of the display decorative portion, the inner-side part may be regarded as the general decorative portion.

The blocking layer is provided on the back side, i.e., the light source side, relative to the transparent base layer. As described above, the blocking layer has the display blocking portion and the general blocking portion.

Each display blocking portion is a part, of the blocking layer, provided on the back side of each display decorative portion described above. Therefore, each display blocking portion is considered to be a part, of the blocking layer, opposed to the paired display decorative portion.

As described above, since the lighting device of the present invention includes the plurality of light sources and the plurality of display decorative portions, the number of the provided display blocking portions also corresponds to the numbers of the light sources and the display decorative portions.

The light transmittance of the display blocking portion is higher than the light transmittance of the general blocking portion. Preferably, the light transmittance of the display blocking portion is not less than 50%, not less than 70%, or not less than 90%, for example. Preferably, the light transmittance of the general blocking portion is not greater than 30%, not greater than 10%, or not greater than 5%, for example. Particularly preferably, the light transmittance of the display blocking portion is 100%, and particularly preferably, the light transmittance of the general blocking portion is 0%.

Examples of combinations of a preferable range of the light transmittance of the display blocking portion and a preferable range of the light transmittance of the general blocking portion include a combination in which the light transmittance of the display blocking portion is not less than 50% and the light transmittance of the general blocking portion is not greater than 30%, a combination in which the light transmittance of the display blocking portion is not less than 70% and the light transmittance of the general blocking portion is not greater than 10%, and a combination in which the light transmittance of the display blocking portion is not less than 90% and the light transmittance of the general blocking portion is not greater than 5%.

The display blocking portion may be a mere opening or a transparent material such as transparent resin, for example. The general blocking portion is preferably made of one or a plurality of kinds of materials such as a paint, a colored resin material, a molded-in-color resin material, and metal, for example.

A method for forming the blocking layer on the back side of the transparent base layer is not particularly limited, and for example, a known method such as printing, painting, deposition, or adhesion is employed.

In a case such as forming the blocking layer on the back side of the transparent base layer by adhesion, another layer such as an adhesion layer may be interposed between the transparent base layer and the blocking layer. In this case, preferably, the light transmittance of the above other layer is higher (in other words, a higher transmittance) than the light transmittance of the transparent base layer or the light transmittance of the display blocking portion of the blocking layer. Particularly preferably, the refractive index of the adhesion layer is higher (in other words, a higher refractive index) than the refractive index of the transparent base layer.

The shape of the display blocking portion of the blocking layer may be a shape corresponding to the paired display decorative portion. The light transmittance of the display blocking portion may be uniform or may be different among parts.

In a case where the light transmittance of the display blocking portion is different among parts, the light transmittance of the display blocking portion refers to the light transmittance of the highest-light-transmittance part in the display blocking portion.

Similarly, the light transmittance of the general blocking portion may be uniform or may be different among parts.

In a case where the light transmittance of the general blocking portion is different among parts, the light transmittance of the general blocking portion refers to the light transmittance of the highest-light-transmittance part in the general blocking portion.

As described above, the display panel in the lighting device of the present invention includes the plurality of display decorative portions and the plurality of display blocking portions which are respectively opposed to and paired with each other. The paired display decorative portion and display blocking portion form a part of a light path of light emitted by the same light source.

In the lighting device of the present invention, in a projection view when projected in the front-back direction, the blocking outer-edge portion which is at least a part of an outer edge of the display blocking portion is located on the radially outer side relative to the decorative outer-edge portion which is an outer edge of the paired display decorative portion. In other words, around the optical axis of the light source, the blocking outer-edge portion corresponding to the light source is located on the radially outer side relative to the decorative outer-edge portion.

Further, in other words, in the lighting device of the present invention, only apart of an outer edge of the display blocking portion may be the blocking outer-edge portion located on the radially outer side relative to the decorative outer-edge portion, or the entire periphery of the display blocking portion may be the blocking outer-edge portion.

In either case, at least at the part where the blocking outer-edge portion is present, an effect by the blocking outer-edge portion, i.e., an effect of causing a sufficient amount of light to reach the display decorative portion and luminously displaying a clear sign by the display decorative portion, is exhibited.

Here, in a case of mounting the lighting device of the present invention to a vehicle, there is a preferable relationship for dimensions of parts of the display panel. Specifically, the relationship among a thickness t of the transparent base layer, a refractive angle $\theta 2$ of the transparent base layer, and a radial-direction distance x between the blocking outer-edge portion and the decorative outer-edge portion preferably satisfies $x=t \times \tan \theta 2$. As described in detail in a section of embodiments, if these dimensions satisfy the above relationship, when an occupant seated on a seat views the lighting device of the present invention, the sign displayed by the lighting device is visually recognized as being clearer.

For reference, the refractive angle $\theta 2$ of the transparent base layer may be derived using an expression $\theta 2=\arcsin(\sin \theta 1/nd)$ on the basis of a refractive index nd of the transparent base layer and an incident angle $\theta 1$ to the transparent base layer. The incident angle $\theta 1$ to the transparent base layer is an angle formed by a line extending in the front-back direction and a line L1 connecting the midpoint between the two eyes of the occupant seated on the seat and a point located at the advancing-direction most-forward side of the occupant on the surface of the decorative outer-edge portion of the display decorative portion.

The above incident angle $\theta 1$ differs variously depending on the body height of the occupant seated on the seat, the position of the seat, and the like. In the lighting device of the present invention, for example, the display panel may be configured to be movable, thereby adjusting the incident angle $\theta 1$ for each occupant seated on the seat. Alternatively, with a target occupant assumed, a general-purpose value of the incident angle $\theta 1$ may be set on the basis of the sitting height of the occupant, or the like.

Specifically, in a case where the occupant's eye position is low, i.e., the incident angle $\theta 1$ is small, particularly, such a defect that the above display decorative portion appears partially lacking, is likely to occur.

Therefore, as a target occupant for setting the above general-purpose value of the incident angle $\theta 1$, a short-height occupant is preferably employed.

As described later, in embodiments of the present invention, as the target occupant, Hybrid-III AF05 (so-called AF05 dummy) which is a crash test human body model was employed. The AF05 dummy is a crash test human body model that complies with the standard [49CFR Part572] of National Highway Traffic Safety Administration and resembles a comparatively short-height woman.

As a value for a base for calculating the incident angle θ1, a vertical-direction distance L2 between the front end of the display decorative portion at a position farthest from the occupant's eyes, and the occupant's eyes, may be employed.

As a matter of course, L2 also differs variously depending on the body height of the occupant seated on the seat, the position of the seat, and the like. Therefore, also for L2, a general-purpose value is preferably set, and the general-purpose value of L2 is, for example, 450 mm.

A specific example of the above general-purpose value of the incident angle θ1 is 55° or 50°.

Here, in the lighting device of the present invention, the display panel and the light-blocking case portion may closely contact with each other in the front-back direction or may be separated from each other. In view of the structure in which the back surface of the display panel is formed by the blocking layer, the display panel and the light-blocking case portion are preferably separated from each other in order to prevent damage of the blocking layer.

In a case where the display panel and the light-blocking case portion are separated from each other in the front-back direction, light emitted by the light source leaks to outside through a gap between the display panel and the light-blocking case portion.

If the light leaking outside through the gap between the display panel and the light-blocking case portion is seen through an area other than the display area of the display panel, a sign luminously displayed by the lighting device of the present invention is likely to be unclear.

Therefore, the display panel in the lighting device of the present invention preferably has a protrusion for covering the gap between the light-blocking case portion and the display panel.

The protrusion is preferably provided further toward the radially outer side relative to the blocking outer-edge portion of the display panel, and the back surface of the protrusion is preferably formed by the general blocking portion of the blocking layer.

By providing such a protrusion to the lighting device of the present invention, leakage of light to outside from the gap between the display panel and the light-blocking case portion is prevented, so that a clearer sign is luminously displayed by the lighting device of the present invention.

The protruding length of the protrusion is not particularly limited, but in order to more reliably prevent leakage of light from the gap between the light-blocking case portion and the display panel, the back-side end of the protrusion is particularly preferably located on the back side relative to the front-side end of the light-blocking case portion.

Hereinafter, the lighting device of the present invention will be described using specific examples.

Embodiment 1

A lighting device of embodiment 1 forms a part of a center console box provided in a vehicle compartment, and a display panel of the lighting device forms a part of an upper panel of the center console box.

Figure 1:
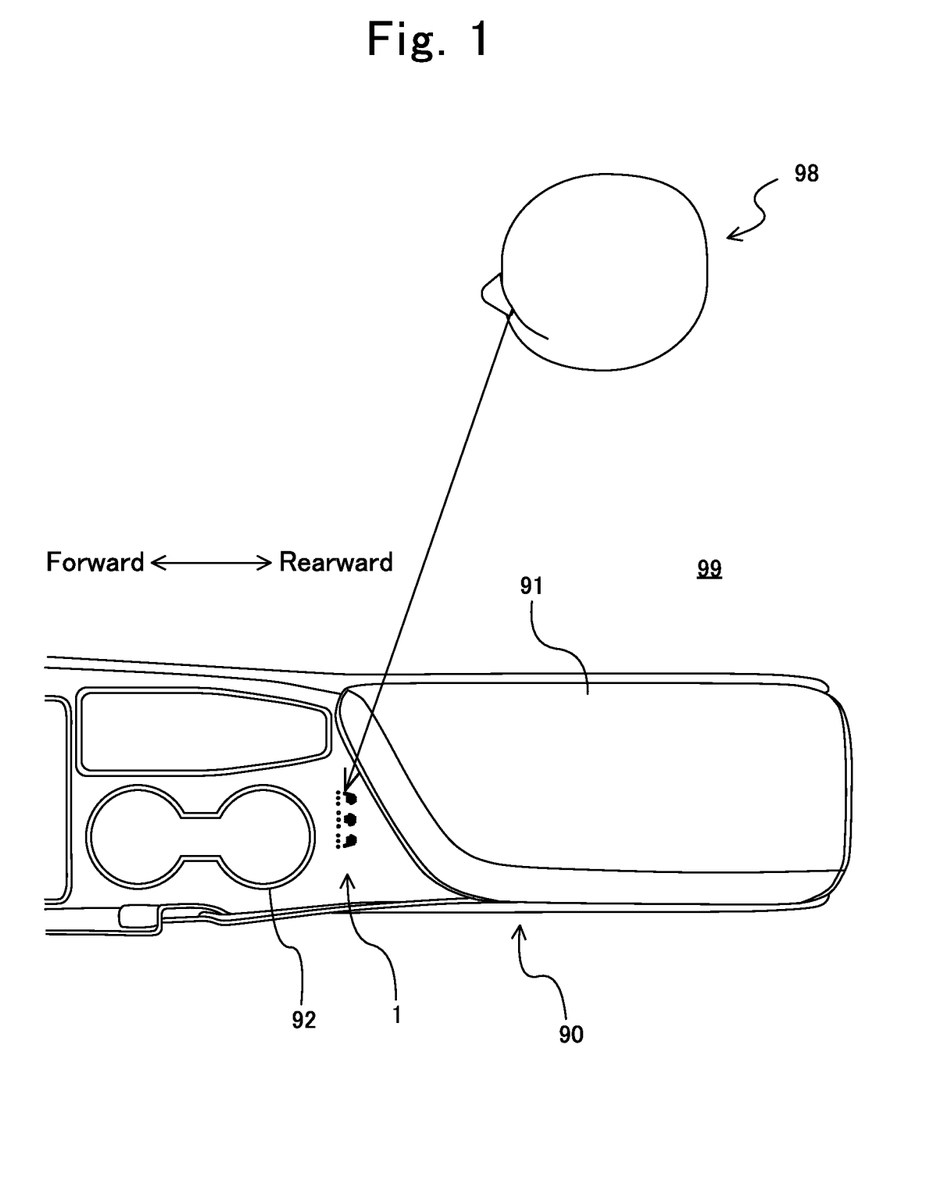
FIG. 1 schematically illustrates a lighting device of embodiment 1.
Figure 2:
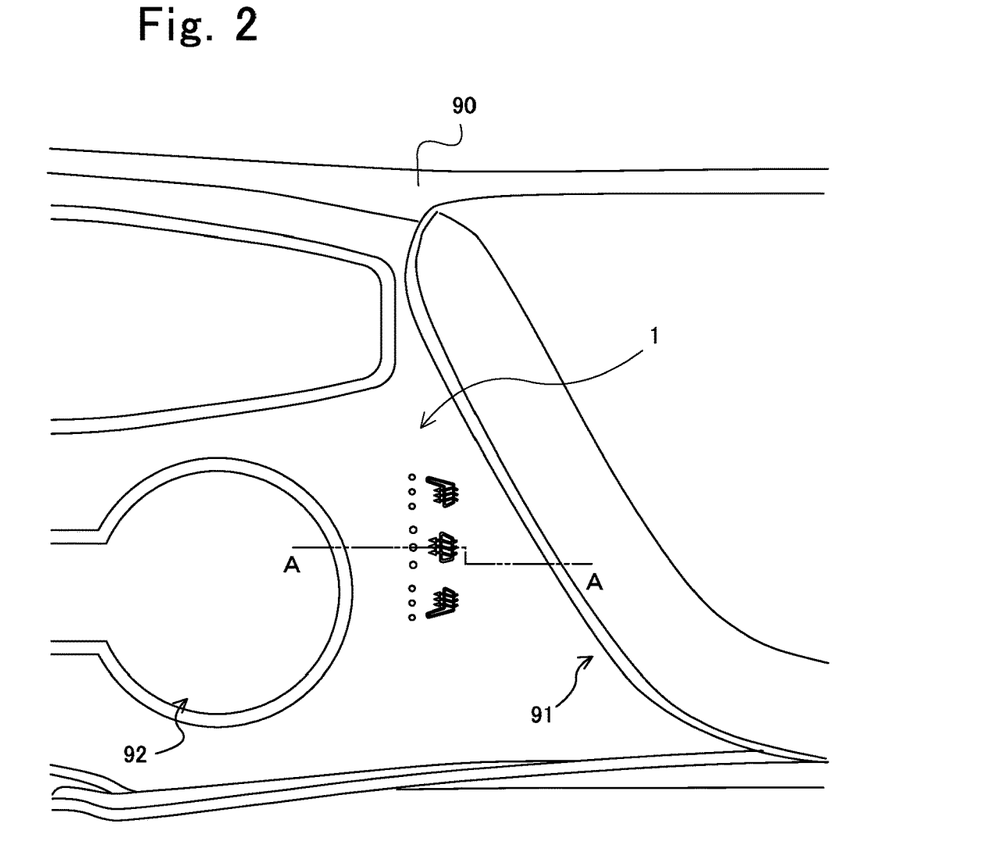
FIG. 2 schematically illustrates the lighting device of embodiment 1.

FIG. 1 and FIG. 2 schematically illustrate the lighting device of embodiment 1. FIG. 1 schematically illustrates the positional relationship between the lighting device of embodiment 1 and an occupant seated on a seat, and FIG. 2 is a specific-part enlarged view of FIG. 1.

Figure 3:
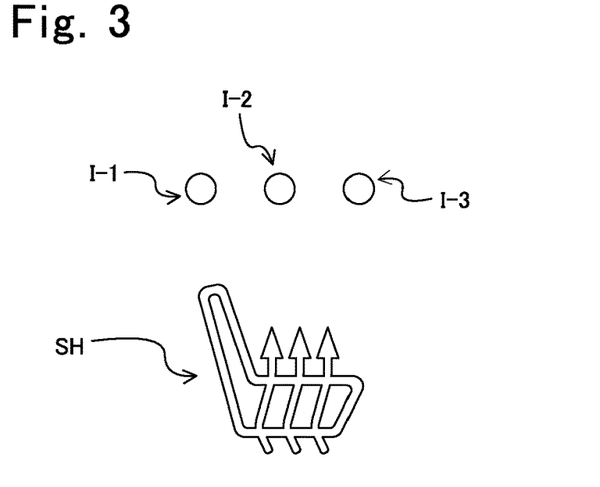
FIG. 3 schematically illustrates some of a plurality of signs luminously displayed by the lighting device of embodiment 1.
Figure 4:
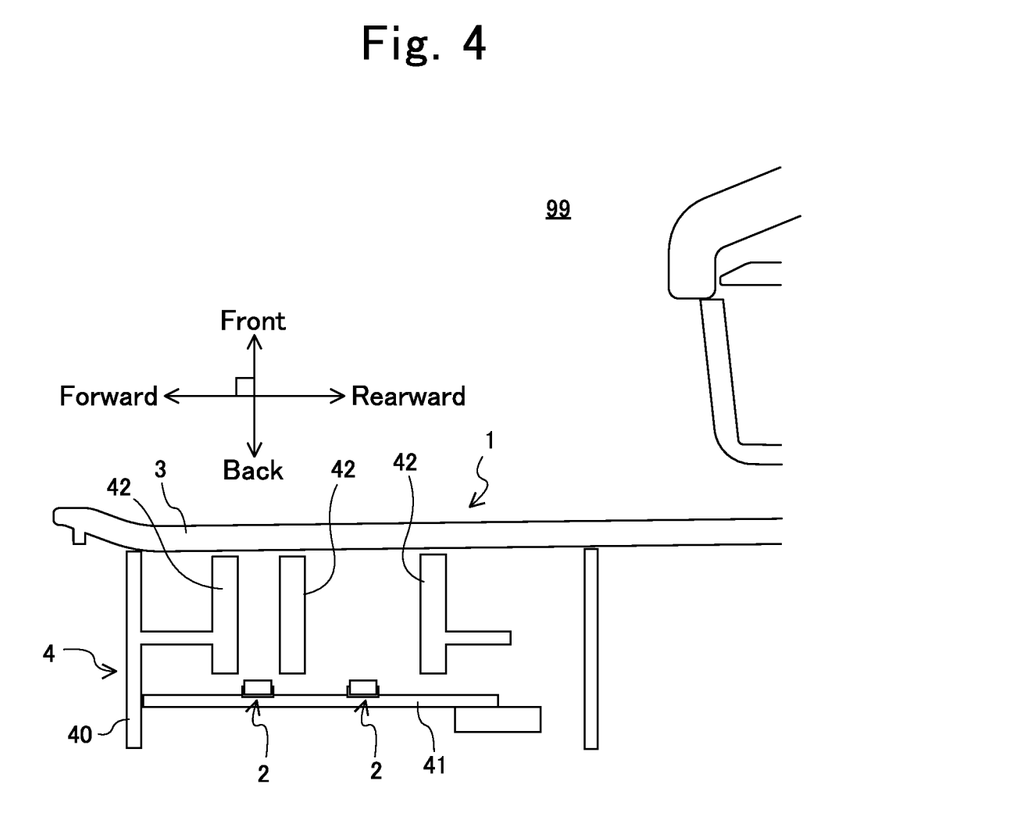
FIG. 4 schematically illustrates a cross-section of the lighting device of embodiment 1 taken along line A-A in FIG. 2.
Figure 5:
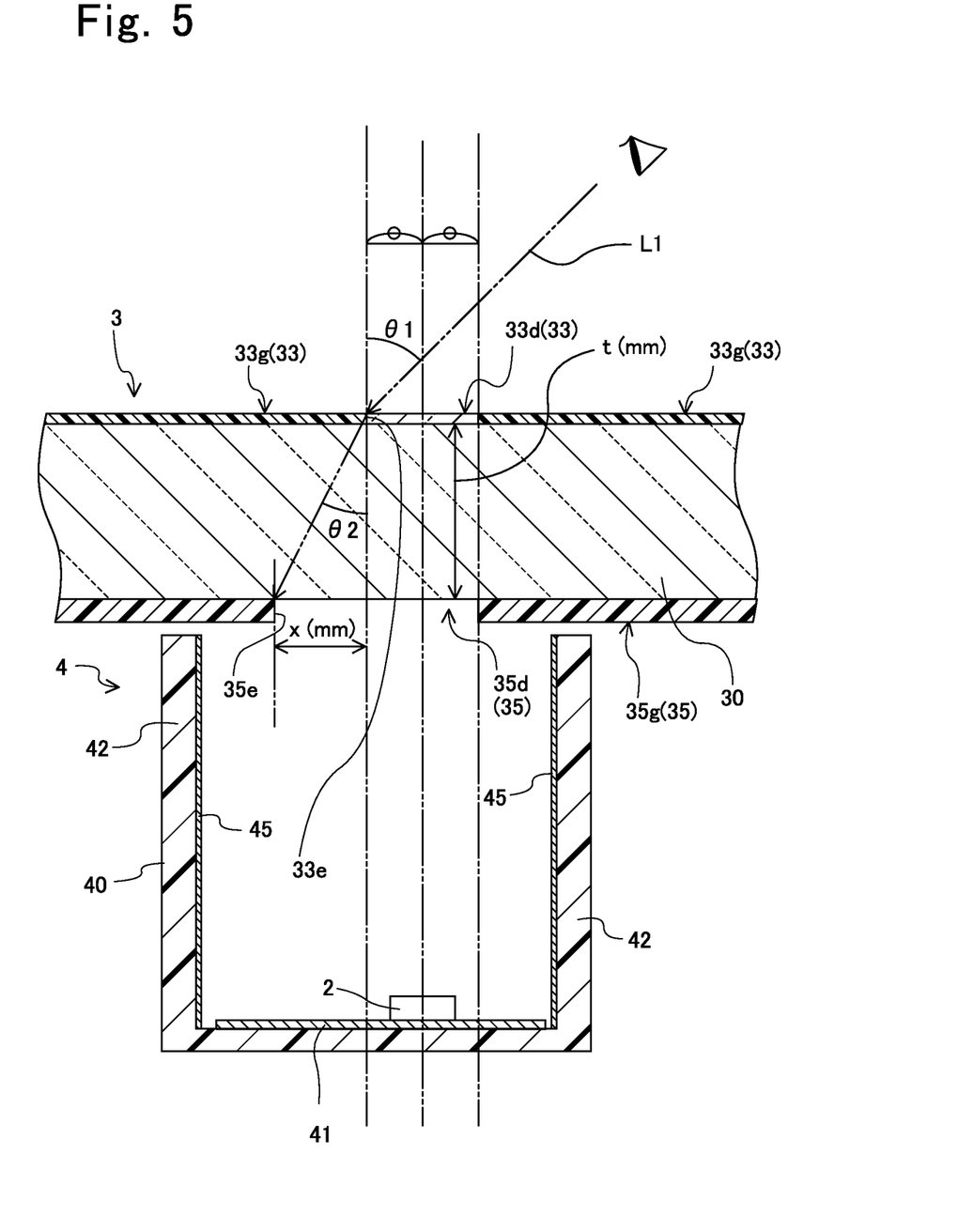
FIG. 5 schematically illustrates dimensions of parts of the lighting device of embodiment 1.

FIG. 3 schematically illustrates some of a plurality of signs luminously displayed by the lighting device of embodiment 1. FIG. 4 schematically illustrates a cross-section of the lighting device of embodiment 1 taken along line A-A in FIG. 2. FIG. 5 schematically illustrates dimensions of parts of the lighting device of embodiment 1.

Hereinafter, front, back, left, right, forward, and rearward refer to front, back, left, right, forward, and rearward shown in the drawings. The front-back direction coincides with the vertical direction, the forward-rearward direction coincides with the vehicle advancing direction, and the left-right direction coincides with the vehicle width direction.

As shown in FIG. 1, the lighting device 1 of embodiment 1 forms a part of a center console box 90 for vehicle, and is provided in a vehicle compartment 99 of a vehicle (not shown) together with other parts of the center console box 90.

As shown in FIG. 1 and FIG. 2, the lighting device 1 of embodiment 1 is located on the forward side of an arm rest 91 and the rearward side of a drink holder 92 at the center console box 90.

As shown in FIG. 4, the lighting device 1 includes a plurality of light sources 2, a display panel 3, and a light-blocking case portion 4, and among these, the display panel 3 is exposed in the vehicle compartment 99. As shown in FIG. 3, the display panel 3 in the lighting device 1 of embodiment 1 displays a sign representing ON/OFF of a seat heater and three indicator signs representing the operation state of the heater.

As described later, various signs are luminously displayed by the respective light sources 2 lighting up.

When a fourth light source (not shown) lights up, a sign SH of a seat heater (not shown) corresponding thereto is luminously displayed. This indicates, to an occupant 98, that the seat heater is ON.

When a first light source (not shown) lights up, a first indicator sign I-1 which is an indicator sign corresponding thereto is luminously displayed.

When a second light source (not shown) lights up, a second indicator sign I-2 which is an indicator sign corresponding thereto is luminously displayed.

When a third light source (not shown) lights up, a third indicator sign I-3 which is an indicator sign corresponding thereto is luminously displayed.

When only the first indicator sign I-1 is luminously displayed, the occupant 98 recognizes that the seat heater is operated at a low temperature. When the two first and second indicator signs I-1 and I-2 are luminously displayed, the occupant 98 recognizes that the seat heater is operated at a middle temperature. When all of the first, second, and third indicator signs I-1, I-2, I-3 are luminously displayed, the occupant 98 recognizes that the seat heater is operated at a high temperature.

As shown in FIG. 4, the light-blocking case portion 4 and the light sources 2 of the lighting device 1 of embodiment 1 are located on the back side of the display panel 3.

Each light source 2 is an LED lamp, is stored in the light-blocking case portion 4, and emits light toward the front side.

As shown in FIG. 4, the light-blocking case portion 4 includes a body portion 40, and a base plate 41 and a reflection layer 45 (see FIG. 5) which are integrated with the body portion 40.

The body portion 40 of the light-blocking case portion 4 has a box shape that opens on the front side, and is made of molded-in-color resin having almost no light-transmitting property. The body portion 40 has a tubular side wall 42 covering each light source 2 from the radially outer side. The side wall 42 opens on the front and back sides such that the axial direction thereof is directed in the front-back direction. The base plate 41 is located inside the body portion 40, and the light sources 2 are attached to the base plate 41.

As shown in FIG. 5, on the inner peripheral surface of each side wall 42, the reflection layer 45 which reflects visible light toward the radially inner side, i.e., the light source 2 side, is formed. The reflection layer 45 reflects visible light.

Light emitted by each light source 2 advances also in a direction other than the front-side direction, but is reflected by the reflection layer 45 so that most of the light is emitted toward the front side of the light-blocking case portion 4.

The display panel 3 includes a transparent base layer 30, a decorative layer 33, and a blocking layer 35.

The transparent base layer 30 is made of polycarbonate and is literally transparent.

The decorative layer 33 has a general decorative portion 33g and a plurality of display decorative portions 33d.

As the material of the decorative layer 33, a transparent base made of resin and a coloring pigment are used. More specifically, the material of the display decorative portion 33d is only a transparent base, and the material of the general decorative portion 33g is a colored paint having a transparent base and a coloring pigment mixed therein. The decorative layer 33 is printed and formed on the front side of the transparent base layer 30.

In the lighting device 1 of embodiment 1, the light transmittance of each display decorative portion 33d is about 80%, and the light transmittance of the general decorative portion 33g is about 20%.

The number of the provided display decorative portions 33d corresponds to the number of the light sources 2. Each display decorative portion 33d is respectively located on the front side of each light source 2. The center of each display decorative portion 33d substantially coincides with the center of the corresponding light source 2.

The blocking layer 35 has a general blocking portion 35g and a plurality of display blocking portions 35d. The material of the blocking layer 35 is a colored paint having a transparent base and a coloring pigment mixed therein, and the blocking layer 35 is printed and formed on the back side of the transparent base layer 30 excluding areas serving as the respective display blocking portions 35d. Therefore, the general blocking portion 35g is also considered to be a part formed by the paint, of the blocking layer 35, and each display blocking portion 35d is also considered to be an opening provided in the blocking layer 35.

In the lighting device 1 of embodiment 1, the light transmittance of each display blocking portion 35d is 100%, and the light transmittance of the general blocking portion 35g is almost 0%.

The number of the provided display blocking portions 35d also corresponds to the number of the light sources 2, and each display decorative portion 33d is respectively located on the back side of each light source 2. The display decorative portion 33d and the display blocking portion 35d respectively located on the front side and the back side of one light source 2 are considered to be paired.

The paired display decorative portion 33d and display blocking portion 35d, and a part interposed therebetween, of the transparent base layer 30, form one light emission area. The light emission area and the light source 2 corresponding thereto form one light emission portion. The lighting device 1 of embodiment 1 includes a plurality of light emission portions, and the display panel 3 in the lighting device 1 of embodiment 1 includes a plurality of display areas.

The center of each display blocking portion 35d is slightly shifted from the center of the corresponding light source 2.

Specifically, as shown in FIG. 5, of an outer edge of each display blocking portion 35d, a blocking outer-edge portion 35e which is a part located forward on the line of sight of the occupant 98 is present on the radially outer side, i.e., the forward side relative to a decorative outer-edge portion 33e which is an outer edge of the paired display decorative portion 33d.

Here, in the lighting device 1 of embodiment 1, a refractive index nd of the transparent base layer 30 is 1.58, and an incident angle $\theta 1$ to the transparent base layer 30 is 50°. Therefore, a refractive angle $\theta 2$ of the transparent base layer 30 is $\theta 2 = \arcsin(\sin \theta 1 / nd) = 29°$.

For reference, the above value of $\theta 1$ was calculated as follows.

First, when an AF05 dummy as an occupant sat on a seat, the midpoint between the eyes of the AF05 dummy was calculated. Then, a line L1 connecting the midpoint and a point located at the advancing-direction most-forward side of the AF05 dummy on the surface of the decorative outer-edge portion 33e was calculated, and an angle formed by L1 and a vertical line was defined as 1.

Here, a thickness t of the transparent base layer 30 is 3 mm. Thus, a radial-direction distance x between the blocking outer-edge portion 35e and the decorative outer-edge portion 33e is $x = t \times \tan \theta 2 \approx 1.7$ (mm).

In the lighting device 1 of embodiment 1, light emitted by each light source 2 and advancing toward the front side of the light source 2 is transmitted through the display blocking portion 35d of the blocking layer 35, to enter the transparent base layer 30, and then is emitted toward the front side of the display panel 3 through the display decorative portion 33d of the decorative layer 33. Meanwhile, light emitted by each light source 2 and advancing in a direction other than the front-side direction of the light source 2 is reflected by the reflection layer 45 of the light-blocking case portion 4, to change the light path toward the front side of the light source 2, or is blocked by the general blocking portion 35g of the blocking layer 35.

Thus, light emitted by each light source 2 is unlikely to reach the adjacent display area, so that the lighting device 1 of embodiment 1 enables luminous display of a clear sign.

In the lighting device 1 of embodiment 1, the blocking outer-edge portion 35e of the display panel 3 is located on the radially outer side relative to the decorative outer-edge portion 33e of the paired display decorative portion 33d. Thus, in the lighting device 1 of embodiment 1, a sufficient amount of light reaches, in particular, a part located forward on the line of sight of the occupant 98, of the display decorative portion 33d, whereby the entire display decorative portion 33d is lit up brightly. Thus, such a defect that the display decorative portion appears partially lacking is prevented, and a clear sign is luminously displayed.

Embodiment 2

A lighting device of embodiment 2 is substantially the same as the lighting device of embodiment 1 except for the shape of the display panel.

Figure 6:
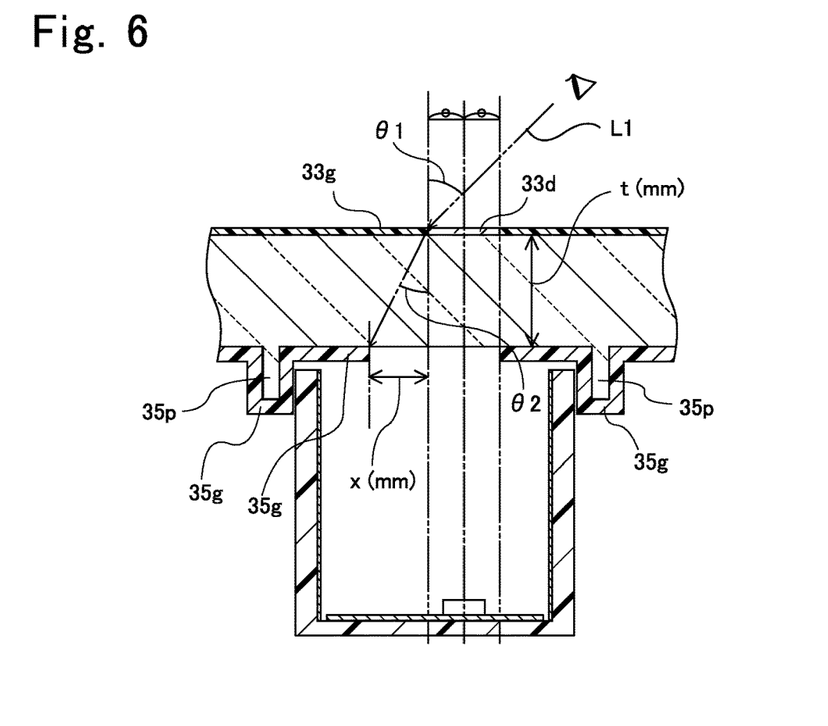
FIG. 6 schematically illustrates dimensions of parts of a lighting device of embodiment 2.

FIG. 6 schematically illustrates dimensions of parts of the lighting device of embodiment 2.

As shown in FIG. 6, in the display panel 3 in the lighting device 1 of embodiment 2, a part on the radially outer side relative to the blocking outer-edge portion 35e forms a protrusion 35p protruding toward the back side.

The back-side end of the protrusion 35p is located on the back side relative to the front-side end of the side wall 42, on the radially outer side relative to the side wall 42 of the light-blocking case portion 4. In addition, the general blocking portion 35g of the blocking layer 35 is provided on the back side of the protrusion 35p.

The lighting device 1 of embodiment 2 is substantially the same as the lighting device 1 of embodiment 1 except for the protrusion 35p and the general blocking portion 35g located on the back side of the protrusion 35p.

In the lighting device 1 of embodiment 2, the side wall 42 of the light-blocking case portion 4 is covered from the forward side and the radially outer side by the protrusion 35p and the general blocking portion 35g present on the back side of the protrusion 35p. Thus, light leaking toward the forward side and the radially outer side of the light-blocking case portion 4 is efficiently blocked by the general blocking portion 35g present on the back side of the protrusion 35p. Thus, the lighting device 1 of embodiment 2 enables luminous display of a clearer sign.

Embodiment 3

A lighting device of embodiment 3 is substantially the same as the lighting device of embodiment 1 except for the shape of the display panel.

Figure 7:
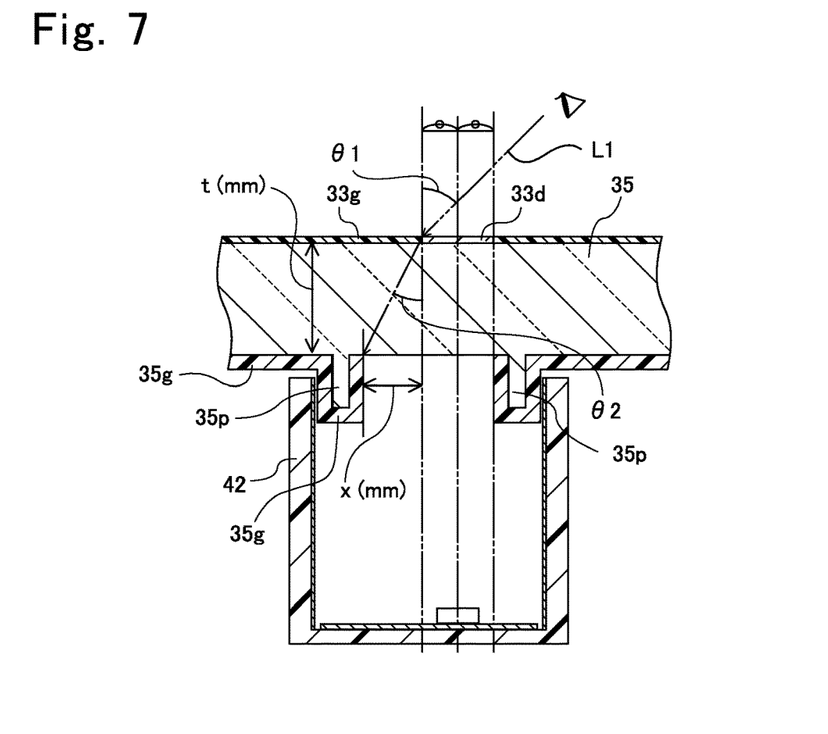
FIG. 7 schematically illustrates dimensions of parts of a lighting device of embodiment 3.

FIG. 7 schematically illustrates dimensions of parts of the lighting device of embodiment 3.

As shown in FIG. 7, in the display panel 3 in the lighting device 1 of embodiment 3, a part on the radially outer side relative to the blocking outer-edge portion 35e forms the protrusion 35p protruding toward the back side.

The back-side end of the protrusion 35p is located on the back side relative to the front-side end of the side wall 42, on the radially inner side relative to the side wall 42 of the light-blocking case portion 4. In addition, the general blocking portion 35g of the blocking layer 35 is provided on the back side of the protrusion 35p.

Also the lighting device 1 of embodiment 3 is substantially the same as the lighting device 1 in the embodiment 1 except for the protrusion 35p and the general blocking portion 35g located on the back side of the protrusion 35p.

Also in the lighting device 1 of embodiment 3, the side wall 42 of the light-blocking case portion 4 is covered from the forward side and the radially outer side by the protrusion 35p and the general blocking portion 35g present on the back side of the protrusion 35p. Therefore, also in the lighting device 1 of embodiment 3, as in the lighting device 1 of embodiment 2, light leaking toward the forward side and the radially outer side of the light-blocking case portion 4 is efficiently blocked by the general blocking portion 35g present on the back side of the protrusion 35p. Thus, also the lighting device 1 of embodiment 3 enables luminous display of a clearer sign.

The present invention is not limited to only the embodiments described above and shown in the drawings, but may be modified as appropriate without deviating from the scope of the present invention. In addition, the components shown in the description including the embodiments may be optionally taken out and combined with each other to carry out the present invention.

The invention claimed is:
1. A lighting device comprising:
a plurality of light sources;
a display panel located on a front side of the light sources; and
a light-blocking case portion storing each light source in a state in which a light path of the light source directed toward the front side is opened, wherein
the display panel has a layered structure including a transparent base layer, a decorative layer located on the front side relative to the transparent base layer, and a blocking layer located on a back side relative to the transparent base layer,
the decorative layer has a general decorative portion, and a plurality of display decorative portions each located on the front side of the corresponding light source,
each of the plurality of display decorative portions covers a front side of the transparent base layer and is comprised of material having a higher light transmittance than the general decorative portion,
the blocking layer has a general blocking portion, and a plurality of display blocking portions each opposed to the paired display decorative portion and having a higher light transmittance than the general blocking portion,
in a projection view when projected in a front-back direction, a blocking outer-edge portion which is at least a part of an outer edge of each display blocking portion is located on a radially outer side relative to a decorative outer-edge portion which is an outer edge of the paired display decorative portion, and
a relationship among a thickness t of the transparent base layer, a refractive angle θ2 of the transparent base layer, and a radial-direction distance x between the blocking outer-edge portion and the decorative outer-edge portion, satisfies x=t×tan θ2.
2. The lighting device according to claim 1, wherein each of the plurality of display decorative portions is made of a transparent material.
3. A lighting device comprising:
a plurality of light sources;
a display panel located on a front side of the light sources; and
a light-blocking case portion storing each light source in a state in which a light path of the light source directed toward the front side is opened, wherein
the display panel has a layered structure including a transparent base layer, a decorative layer located on the front side relative to the transparent base layer, and a blocking layer located on a back side relative to the transparent base layer,
the decorative layer has a general decorative portion, and a plurality of display decorative portions each located on the front side of the corresponding light source,
each of the plurality of display decorative portions covers a front side of the transparent base layer and is comprised of material having a higher light transmittance than the general decorative portion,
the blocking layer has a general blocking portion, and a plurality of display blocking portions each opposed to the paired display decorative portion and having a higher light transmittance than the general blocking portion,
in a projection view when projected in a front-back direction, a blocking outer-edge portion which is at least a part of an outer edge of each display blocking portion is located on a radially outer side relative to a decorative outer-edge portion which is an outer edge of the paired display decorative portion,
the display panel has a protrusion protruding toward the back side, on the radially outer side relative to the blocking outer-edge portion, a back-side end of the protrusion is located on the back side relative to a front-side end of the light-blocking case portion, and a back surface of the protrusion is formed by the general blocking portion of the blocking layer.

4. A display panel located on a front side of a plurality of light sources, the display panel having a layered structure including a transparent base layer, a decorative layer located on the front side relative to the transparent base layer, and a blocking layer located on a back side relative to the transparent base layer, wherein the decorative layer has a general decorative portion, and a plurality of display decorative portions each located on the front side of the corresponding light source, each of the plurality of display decorative portions covers a front side of the transparent base layer and is comprised of material having a higher light transmittance than the general decorative portion, the blocking layer has a general blocking portion, and a plurality of display blocking portions each opposed to the paired display decorative portion and having a higher light transmittance than the general blocking portion, in a projection view when projected in a front-back direction, a blocking outer-edge portion which is at least a part of an outer edge of each display blocking portion is located on a radially outer side relative to a decorative outer-edge portion which is an outer edge of the paired display decorative portion, and a relationship among a thickness t of the transparent base layer, a refractive angle $\theta 2$ of the transparent base layer, and a radial-direction distance x between the blocking outer-edge portion and the decorative outer-edge portion, satisfies $x = t \times \tan \theta 2$.

5. The display panel according to claim 4, further comprising a protrusion protruding toward the back side, on the radially outer side relative to the blocking outer-edge portion, wherein a back surface of the protrusion is formed by the general blocking portion of the blocking layer.

6. The display panel according to claim 4, wherein each of the plurality of display decorative portions is made of a transparent material.

* * * * *